May 7, 1963 D. E. CLARK 3,088,695
VTO INLET
Filed Feb. 12, 1962
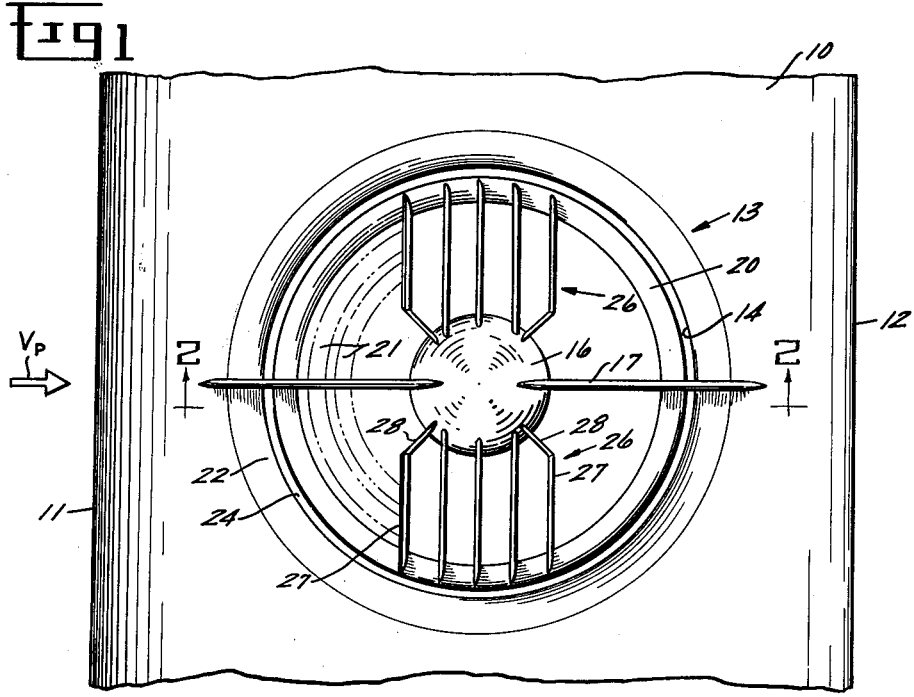
Fig 1
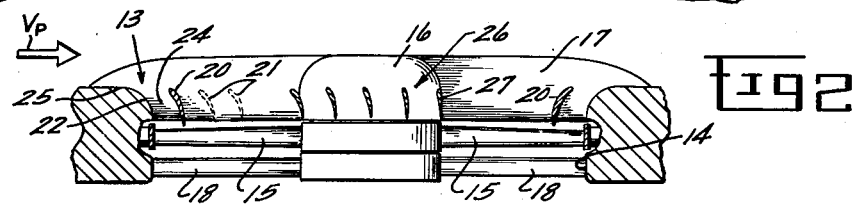
Fig 2
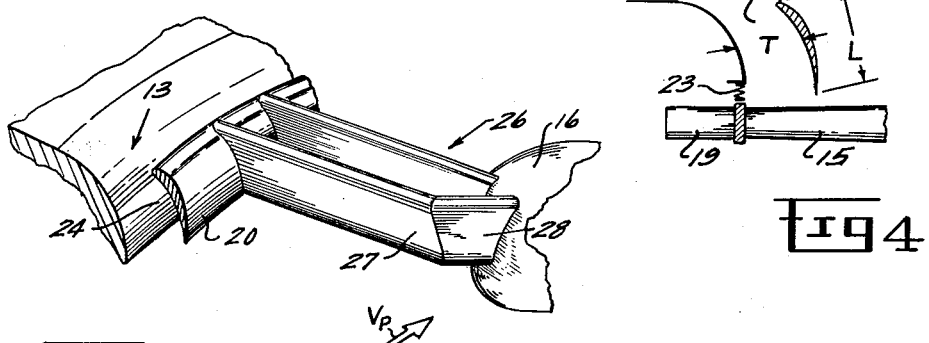
Fig 3
Fig 4
INVENTOR.
DONALD E. CLARK
BY
ATTORNEY United States Patent Office 3,088,695
Patented May 7, 1963

3,088,695
VTO INLET
Donald Edwin Clark, Cincinnati, Ohio, assignor to General Electric Company, a corporation of New York
Filed Feb. 12, 1962, Ser. No. 172,678
9 Claims. (Cl. 244—12)

The invention relates to an inlet for a vertical take off aircraft designed for both vertical and horizontal flight, and more particularly, to an inlet for the lift fan for such an aircraft wherein optimum performance of the inlet is made possible in the vertical, hover, and transition portions of the flight.

In vertical take off aircraft in which fans for providing vertical lift are disposed in the wing, or if in the fuselage near the upper surface thereof, and mounted on an axis of rotation fixed in the direction of vertical flight, a problem exists of devising an inlet which provides optimum airflow through the fan duct for both vertical take off from a stationary condition, for hovering, and for the transition from vertical to horizontal or forward flight. For strictly vertical take off and hovering, the configuration of the inlet duct does not have to allow for a change of direction of the air drawn into the fan duct. For the transition from vertical flight to horizontal flight, and vice versa, the inlet must be capable of receiving high velocity air flowing over the surface, such as a wing, and subjecting it to a sudden substantially right angle change of direction into the fan axis. In making this sudden change of direction, air has a tendency to separate from the edge of the bellmouth comprising the fan inlet leaving a relatively low pressure or low density area in the vicinity of the bellmouth radius and causing consequent losses of effective inlet flow and distortion of the velocity field in the fan duct. These effects are deleterious to fan performance.

Since the fan inlet in the well known lift fan configuration of aircraft is closed during horizontal flight, the inlet must be designed to satisfy two objectives. First, it must have good hover performance and second, it must provide good performance in transition from vertical to horizontal flight. It is well known that drawing air into an inlet with a change of flow direction is best accomplished by providing the inlet with a bellmouth having a radius of curvature which is relatively large. This may be expressed in terms of a ratio known as the "bellmouth radius ratio" which is the ratio of the radius of the curvature of the bellmouth to the diameter of the inlet. Thus an inlet having a bellmouth ratio of fifty percent can more easily draw air into it than can an inlet having a bellmouth ratio of ten percent. In thin wing installations, because of space limitations, it is desirable to have as sharp a radius of curvature as possible consistent with good performance. Thus, the bellmouth ratio is preferably kept low. However, because of space limitations, where large radiuses cannot be used in a thin wing installation, problems are created and specific structure must be employed to cause the air to flow properly with high efficiency.

The object of the present invention is to provide an improved fan inlet duct for vertical take off aircraft.

Another object of the invention is to provide an inlet for a fan duct of a vertical take off aircraft which provides satisfactory air flow through the duct when the aircraft is stationary or in vertical flight as well as when the aircraft is in the transition portion from vertical to horizontal with high velocity air flowing over the inlet surface.

Another object of this invention is to provide an inlet for a fan duct of a vertical take off aircraft which prevents separation of the air flow from the walls of the inlet and compensates for the blade excitation and stalling due to the advancing-retreating blade loading on the fan.

Briefly, and in accordance with the invention, a bellmouth fan inlet to a duct through an aircraft is provided for a lift fan located generally near the upper surface of the inlet. A means to support a fan within the duct is provided by a bulletnose or its equivalent disposed centrally in the duct. Extending around the duct is a concentric airfoil vane that is spaced from the bellmouth to provide a passage between and to assist in turning the air to prevent separation from the bellmouth. A plurality of substantially straight transverse airfoil vanes are oriented across the inlet duct at right angles to the direction of forward flight and occupy a portion of the inlet area. These transverse vanes are attached at one end to the concentric vane and at the other end to the central bulletnose. All the vanes are oriented with their leading edges upstream into the direction of air flow. The transverse vanes occupy substantially the area projected by the bulletnose and the outermost or end vanes have an inner portion connected radially to the bulletnose. While not necessary for the operation thereof, certain proportions are desirable for maximum efficiency.

Further objects, features and attending advantages of the invention will be apparent by reference to the following specification and drawing in which:

FIGURE 1 is a partial view in plan of an aircraft wing having therein a fan duct inlet of this invention;

FIGURE 2 is a partial view taken along line 2—2 of FIGURE 1;

FIGURE 3 is a partial perspective view of the configuration of the outermost transverse vanes; and, FIGURE 4 is a partial cross-section, partially diagrammatic, of the concentric vane illustrating a desirable ratio.

The present invention is an improved version of different structure and for a different installation of the invention shown in co-pending application Serial No. 47,425, filed August 4, 1960, now Patent No. 3,033,491, and assigned to the assignee of the instant invention.

Referring to FIGURE 1, a fragmentary portion of an aircraft is shown having a wing 10 with a leading edge 11 and a trailing edge 12 and having therein a bellmouth fan inlet generally indicated at 13 forming part of and leading to a duct 14 through wing 10. As seen in FIGURE 2, this structure is designed to hold a fan 15 for movement of air through the duct from the upper surface to the lower surface of the wing and to provide vertical lift thereto.

In order to support the fan, a bulletnose member 16 or its equivalent, is disposed centrally of the duct and supported by suitable strut means 17 from the wing structure. The bulletnose contains bearing means, not shown, about which the fan 15 rotates. Adjustable outlet louvers 18 may be provided to direct the exhausting air. The fan is a tip turbine fan, as partially shown in FIGURE 4, wherein turbine blades 19 are fed by exhaust gases to drive the fan by well known means not forming part of the present invention. The structure thus far described, is well known, and provides a setting for the instant invention.

In such a VTO inlet in a wing installation, the bellmouth will normally have a sharp radius because of space limitations due to the thinness of the wing. This results in separation of the incoming air from the surface described by the radius of the bellmouth. In addition, separation is encouraged by any tip leakage from the area of the turbine buckets into the duct as may be seen in FIGURE 4. In order to cure this static problem of air separation over the bellmouth, there is provided an airfoil shaped vane 20 that is concentric with the duct and disposed in the bellmouth to extend completely around the bellmouth as seen in FIGURE 1. This vane is oriented with its leading edge upward and into the air flow Vp and is placed substantially parallel to and contiguous with the bellmouth radius as seen in FIGURE 2. While this vane is primarily to cure the static problem of air separation it also operates in the transition portion of the flight by reducing the tendency of the leading edge lip of the airstream from separating as it passes over the bellmouth radius at 13 in FIGURE 2. Thus, this completely continuous vane is advantageous in both the hovering and the transition portion. While not necessary to the instant invention, if it is desired to delay the separation to higher flight speeds, additional spaced vanes shown dotted at 21 may be placed as shown over the forward portion of the inlet. In order for vane 20 to operate efficiently and keep the losses low, it is arranged substantially parallel to and contiguous with the radius 22 of the bellmouth as seen in FIGURE 2. The vane leading edge extends into the airstream substantially flush with the upper surface of the wing although will, in actuality, be disposed slightly below the surface as shown in FIGURE 4 so that doors, not forming part of the invention, may be provided to cover the inlet duct during forward flight. The vanes preferably extend the full length of the radius curvature 22 and slightly beyond as shown in FIGURE 4 in order to capture and funnel through the fan any seal leakage from the exhaust gas area through seal 23. Thus, it can be seen that the vane 20 defines a substantially constant annular area passage 24 between the vane and the bellmouth. In addition, the vane being substantially flush with the surface is intended to follow the contours of the wing surface around the inlet. Since the maximum velocity peak of the incoming air occurs on the bellmouth radius at a point 25 which is on the radius surface at a point about 45 degrees from the horizontal plane the extending of the vane over the complete radius surface and the essentially constant area passage reduces the peak velocity that occurs at this point and prevents the bellmouth separation.

For most efficient operation, it has been found in practice, that preferred dimensions may be used. These are illustrated in FIGURE 4 which defines the solidity ratio, a term used herein. The solidity ratio is defined as the vane chord L divided by the spacing from the bellmouth radius T. Preferably, this ratio should not be below 1.5 for maximum efficiency. In other words, the L/T ratio has a minimum value of 1.5. Below this value, separation occurs.

In the transition portion with both vertical lift and forward motion additional inlet flow distortion occurs which is not desirable. As fan 15 rotates and the aircraft moves forward the fan blade moving in the direction of flight receives a heavier loading than static conditions and the retreating blade a lighter loading. This is a well known phenomenon of helicopters and occurs because the angle of attack on the blade is changing and this is the reason that helicopter blades are provided with pitch control. The constant loading and unloading of the fan blades as they turn results in a pulsing vibration on the rotor resulting in mechanical complications as well as aerodynamic complications. In other words, the rotating fan blade is subjected to an impulse for each revolution. In order to diminish the magnitude of this rotor blade excitation it is desirable to do something to remove the advancing component of the flight velocity and this is accomplished by the introduction of fixed vanes generally indicated at 26. As can be seen from FIGURE 1, vanes 26 comprise a plurality of spaced vanes that extend across the inlet transverse to the direction of horizontal flight and these are oriented with their leading edges into the airflow. These vanes are preferably parallel as shown and are secured at their ends to the concentric vane 20 and to the bulletnose 16. In addition, the vanes occupy the area defined by the projection of the bulletnose on both sides which is approximately one-third the inlet opening as shown. These vanes are designed to remove most of that component of the cross-load on the sides of the fan where the loading is the most critical and reduce the advancing and retreating blade type load variation. The vanes unload the heavily loaded advancing part of the fan and load up the retreating part of the fan. Thus, the impulse on each revolution of the fan is removed to reduce vibration to correct the mechanical disadvantage and to correct the angle of attack to prevent stall and remove the aerodynamic disadvantage. Preferably, these vanes are long enough to fit in the space between the top surface and the actual rotating part of the fan 15 as seen in FIGURE 2. In addition, in any given space, a preferred number of blades is desired. The number desired is such that the minimum chord to spacing ratio should not exceed 1. As shown on FIGURE 2, this is the ratio of the height of vanes 26 to the space between adjacent vanes. Too few blades tend to operate as isolated airfoils and if too many are supplied a point of diminishing return is reached because of the static loss created by friction of the air across the vanes. The optimum number, as stated above, provides a higher maximum angle of attack before separation and stall on the vanes occurs. Thus, these transverse vanes remove mechanical problems as well as aerodynamic problems.

Because the number of transverse vanes is thus fixed, it can be seen that the outer or extreme vanes 27 will run tangent to the bulletnose 16 across the inlet opening. Since the air prefers to enter along radial lines the extension of vanes 27 across the outlet creates high losses at the intersection with the bulletnose. In order to avoid these losses the extreme vanes 27 are provided with an inner portion 28 that is radial. This is determined by a radial line from the center of the bulletnose to the intersection of vanes 27 and, at that intersection, portion 28 is provided to make the connection to the bulletnose. The intermediate vanes intersect the bulletnose at a high enough angle that this radial portion is not required. Thus, the transverse vanes extend from the inner surface of concentric vane 20 to the bulletnose with the extreme vanes having the radial inner portion 28 for connection to the bulletnose. It can be seen that the annular area passage 24 is thus complete around the inlet and is not disturbed by the transverse vanes.

It can be seen that the structure employed herein uses the complete concentric vane 20 to provide separation in hovering as well as in transition and the transverse vanes 26 compensate for the advancing-retreating blade loading phenomenon to remove the mechanical problems created by the resultant vibration as well as the aerodynamic problems relating to stall. The losses are thus minimized in the construction herein disclosed.

While I have hereinbefore described a preferred form of my invention, obviously modifications and variations of the present invention are possible in the light of the above teachings. It is therefore to be understood that within the scope of the appended claims, the invention may be practiced otherwise than as specifically described.

I claim:
1. In a vertical take off aircraft having a bellmouth fan inlet duct therethrough for a lift fan,
    a bulletnose disposed centrally of said duct for support of said fan,
    an airfoil vane concentric with and disposed in said bellmouth substantially parallel to and contiguous with said bellmouth radius and spaced therefrom forming a passage,
    a plurality of spaced airfoil vanes disposed transverse to the direction of horizontal flight,
    said transverse vanes occupying only part of said inlet total area and secured to said concentric vane and said bulletnose,
    the extreme transverse vanes having a radial portion at their connection to said bulletnose.

2. In a vertical take off aircraft having a bellmouth fan inlet duct therethrough for a lift fan,
- a bulletnose disposed centrally of said duct for support of said fan,
- a fixed airfoil vane concentric with, disposed in, and extending completely around said bellmouth,
- said vane extending parallel to and contiguous with said bellmouth radius to define a substantially constant annular area passage therebetween,
- a plurality of spaced fixed vanes extending across said inlet transverse to the direction of horizontal flight and secured to said concentric vane and to said bulletnose,
- the extreme transverse vanes having a radial portion at their connection to said bulletnose.

3. Apparatus as described in claim 2 wherein the minimum solidity ratio of said concentric vane to said bellmouth radius is 1.5.

4. Apparatus as described in claim 2 wherein said transverse vanes have a minimum chord to spacing ratio of one.

5. Apparatus as described in claim 2 wherein the minimum solidity ratio of said concentric vane to said bellmouth radius is 1.5 and, said transverse vanes have a minimum chord to spacing ratio of one.

6. In a vertical take off aircraft having a bellmouth fan inlet duct through a wing for a lift fan,
- a bulletnose disposed centrally of said duct for support of said fan,
- a fixed airfoil vane concentric with, disposed in, and extending completely around said bellmouth,
- said vane having its leading edge up and extending substantially parallel to and contiguous with said bellmouth radius to define a constant annular area passage therebetween,
- a plurality of spaced fixed airfoil vanes extending across said inlet transverse to the direction of horizontal flight,
- said transverse vanes occupying the area defined by the projection of said bulletnose on both sides thereof and secured at one end to said bulletnose and at the other end to the inner surface of said transverse vane,
- said outermost vanes being connected to said bulletnose by a radial portion.

7. Apparatus as defined in claim 6 wherein the minimum solidity ratio of said concentric vane to said bellmouth radius is 1.5.

8. Apparatus as defined in claim 6 wherein said transverse vanes have a minimum chord to spacing ratio of one.

9. Apparatus as defined in claim 6 wherein the minimum solidity ratio of said concentric vane to said bellmouth radius is 1.5 and, said transverse vanes have a minimum chord to spacing ratio of one.

References Cited in the file of this patent

UNITED STATES PATENTS

| | | |
|---|---|---|
| 3,033,491 | Clark | May 8, 1962 |

FOREIGN PATENTS

| | | |
|---|---|---|
| 811,840 | Great Britain | Apr. 5, 1959 |